US012252270B2

(12) United States Patent
Senerth (10) Patent No.: US 12,252,270 B2
(45) Date of Patent: Mar. 18, 2025

(54) PARALLEL POWER SOURCE FOR AIRCRAFT

(71) Applicant: Boom Technology, Inc., Centennial, CO (US)

(72) Inventor: James Senerth, Philadelphia, PA (US)

(73) Assignee: BOOM TECHNOLOGY, INC., Centennial, CO (US)

(*) Notice: Subject to any disclaimer, the term of this patent is extended or adjusted under 35 U.S.C. 154(b) by 105 days.

(21) Appl. No.: 18/329,342

(22) Filed: Jun. 5, 2023

(65) Prior Publication Data

US 2024/0400224 A1 Dec. 5, 2024

(51) Int. Cl.
*B64F 1/35* (2024.01)
*B64D 27/16* (2006.01)
*B64F 1/34* (2006.01)
*F02C 7/26* (2006.01)

(52) U.S. Cl.
CPC ............... *B64F 1/34* (2013.01); *B64D 27/16* (2013.01); *B64F 1/35* (2024.01); *F02C 7/26* (2013.01)

(58) Field of Classification Search
CPC ... B64F 1/34; B64F 1/35; B64D 27/16; F02C 7/26
See application file for complete search history.

(56) References Cited

U.S. PATENT DOCUMENTS

| | | | | |
|---|---|---|---|---|
| 7,207,521 B2* | 4/2007 | Atkey | ........ | B64D 41/00 244/58 |
| 8,238,130 B2* | 8/2012 | Wiegman | ........ | H02M 5/4585 363/131 |
| 8,427,001 B2* | 4/2013 | Anghel | ........ | H02P 9/42 307/9.1 |
| 9,484,749 B2* | 11/2016 | Brombach | ........ | B64F 1/352 |

* cited by examiner

*Primary Examiner* — Lorne E Meade
(74) *Attorney, Agent, or Firm* — Brake Hughes Bellermann LLP (57) ABSTRACT

A GPU output from a ground power unit (GPU) can be converted to power suitable for starting a jet engine of an aircraft by an auto-transformer rectifier unit (ATRU) of the aircraft. Multiple ATRUs, each connected to a corresponding GPU, may output multiple ATRU outputs, and combining these multiple ATRU outputs can generate a combined power, which can satisfy the power requirements for starting a jet engine when they exceed what can be supplied by a single GPU. The combining is possible when the outputs of the ATRUs are synchronized, which can require generating and sharing a sync signal between the ATRUs that is synchronous with an ATRU designated as the master (i.e., reference) for the other ATRUs.

22 Claims, 7 Drawing Sheets

PARALLEL POWER SOURCE FOR AIRCRAFT

FIELD OF THE DISCLOSURE

The present disclosure relates to a source of power for an aircraft, and more specifically, to a source of power configured to provide sufficient power to start a jet engine of the aircraft.

BACKGROUND

An aircraft may obtain electrical power from a variety of sources. When the aircraft is on the ground and the engines are OFF, electrical power may be supplied to the aircraft by a ground power unit (GPU). The GPU output may be coupled electrically to the aircraft to supply the aircraft with three-phase electrical power (e.g., 115V, 400 Hz). The GPU may generate the three-phase power using a combustion generator or through an electrical conversion (i.e., power converter) of electricity supplied from a power grid (i.e., mains electricity). The GPU may be rated by the energy that it can safely provide. For example, a GPU found at an airport may be rated to provide an energy suitable for most aircraft using the airport. Accordingly, a standard energy rating (e.g., 90 kVA) for GPUs has evolved based on conventional aircraft requirements, and it may be typical for GPUs found at most airports to comply with this standard.

SUMMARY

The present disclosure describes systems and methods for combining power from a plurality of GPUs externally connected to an aircraft while the aircraft is on the ground (e.g., parked). The disclosed approach utilizes a plurality of auto-transformer rectifier units (ATRUs) internal to the aircraft that are each coupled to a corresponding GPU. When outputs of the ATRUs are synchronized by a common sync signal, their outputs can be combined on a bus of the aircraft. The combined power may then be used for applications requiring high power levels, such as electrically starting a jet engine of the aircraft.

In some aspects, the techniques described herein relate to a method for combining power on a bus of an aircraft, the method including: receiving, at a first ATRU, a first GPU output from a first GPU; generating a sync signal at the first ATRU; outputting, at the first ATRU, a first ATRU output based on the first GPU output and the sync signal; receiving, at a second ATRU, a second GPU output from a second GPU and the sync signal from the first ATRU; outputting, at the second ATRU, a second ATRU output based on the second GPU output and the sync signal; and coupling the first ATRU output and the second ATRU output in parallel to the bus to generate a combined power on the bus.

In some aspects, the techniques described herein relate to a system for combining power on a bus of an aircraft, the system including: a first ATRU configured to output a first ATRU output based on a first GPU output from a first GPU, the first ATRU including: a first sync generator/receiver configured to generate a sync signal; a first frequency source configured to generate a first frequency signal based on the sync signal generated by the first sync generator/receiver; a first frequency conversion stage configured to synthesize a first AC waveform based the first GPU output and the first frequency signal; and a first transformer stage configured to transform the first AC waveform to the first ATRU output at a first output of the first ATRU; and a second ATRU configured to output a second ATRU output based on a second GPU output from a second GPU, the second ATRU including: a second sync generator/receiver configured to receive the sync signal from the first ATRU; a second frequency source configured to generate a second frequency signal based on the sync signal received from the first ATRU; a second frequency conversion stage configured to synthesize a second AC waveform based the second GPU output and the second frequency signal; and a second transformer stage configured to transform the second AC waveform to the second ATRU output at a second output of the second ATRU, the first ATRU output and the second ATRU output being synchronized by the sync signal.

In some aspects, the techniques described herein relate to a method for combining power on a bus to start a jet engine of an aircraft, the method including: receiving a plurality of GPU outputs from a plurality of GPUs at a plurality of ATRUs of the aircraft; designating a first ATRU of the plurality of ATRUs as a master ATRU; designating other ATRUs of the plurality of ATRUs as slave ATRUs; operating the first ATRU in a master mode, which includes: generating a sync signal at the master ATRU; and synthesizing a first ATRU output at an output of the first ATRU based on the sync signal and a first GPU output from a first GPU of the plurality of GPUs; operating the other ATRUs in a slave mode, which includes: receiving the sync signal from the master ATRU; and synthesizing other ATRU outputs at outputs of the slave ATRUs based on the sync signal and other GPU outputs from other GPUs of the plurality of GPUs; coupling the first ATRU output and the other ATRU outputs in parallel to the bus to generate a combined power on the bus; and starting the jet engine of the aircraft using the combined power on the bus.

The foregoing illustrative summary, as well as other exemplary objectives and/or advantages of the disclosure, and the manner in which the same are accomplished, are further explained within the following detailed description and its accompanying drawings.

DETAILED DESCRIPTION

Aircraft innovation may require energy at levels that are higher than expected for conventional aircraft. One technical problem facing aircraft innovation is the lack of existing infrastructure to support higher energy requirements. The present disclosure describes systems and methods to address this problem by using existing ground power units (GPUs) to support the higher energy requirements in a way that is scalable and that can accommodate a variety of GPUs found in an ecosystem of ground-support equipment.

Starting a gas-turbine engine (e.g., jet engine) may require more electrical energy than other functions on an aircraft. During a start, electrical energy may be externally supplied to an accessory gearbox (AGB) of the jet engine to turn a shaft of a turbine. The turning shaft may start air flowing through the jet engine to enable a combustion process so that the engine can sustain its movement without the externally supplied electrical energy.

Figure 1:
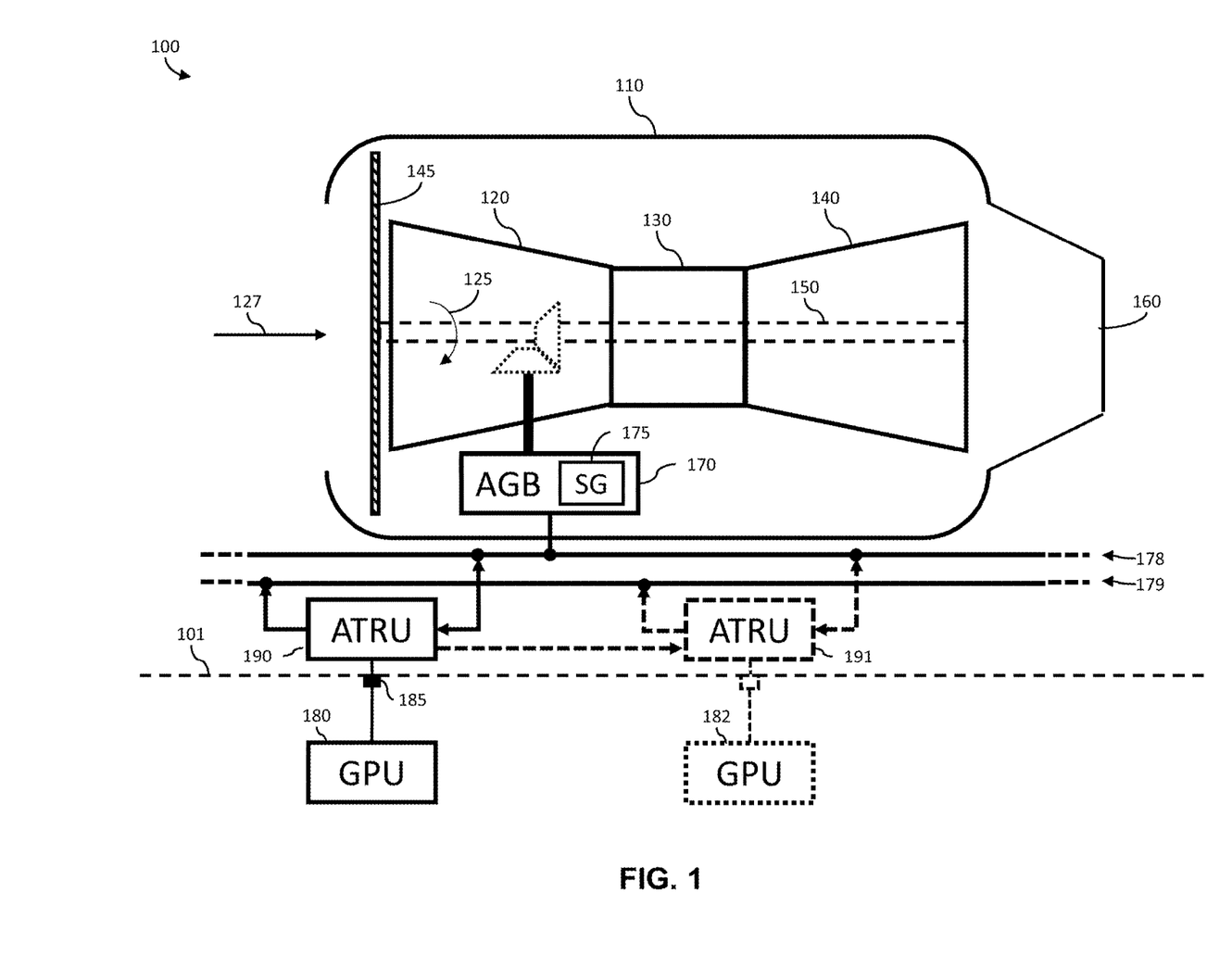
FIG. 1 is a block diagram that schematically depicts a system for starting a jet engine according to a possible implementation of the present disclosure.

FIG. 1 is a block diagram of a system for starting a jet engine of an aircraft according to a possible implementation of the present disclosure. The system 100 includes a gas-turbine engine (i.e., jet engine 110). The jet engine 110 includes a compressor portion 120, a combustion portion 130, and a turbine portion 140. For simplicity, the compressor portion 120 and the combustion portion 130 are shown as mechanically coupled by a shaft 150. In operation, the shaft 150 rotates to draw air 127 into the compressor portion 120 where it is compressed and heated. The heated air is drawn into the combustion portion 130, where the heated air and fuel are mixed and ignited, to form a continuous combustion. The turbine portion 140 is powered by exhaust gasses exiting the combustion portion 130. Energy from the turbine portion 140 may be used to power a fan 145 to provide propulsion. Further, propulsion may be provided by an exhaust nozzle 160, which can further accelerate exiting gasses.

An accessory gearbox 170 may be mechanically coupled to the shaft 150 in order to perform functions while the jet engine 110 is running. The accessory gearbox 170 may further include a starter-generator 175 (SG). The starter-generator 175 may be turned by the accessory gearbox 170 to operate as a generator (i.e., generator mode). In the generator mode, the starter-generator 175 is configured to output electrical power. Conversely, the starter-generator 175 may be configured (by externally supplied electrical power) to operate as a starter for the jet engine 110 (i.e., motor mode). In the motor mode, the starter-generator 175 may output mechanical power to the accessory gearbox 170 to turn the shaft 150.

The aircraft interface 101, shown in FIG. 1, may illustrate which elements can be integrated with (e.g., inside) an aircraft and which elements can be not integrated with (e.g., outside) the aircraft. For example, the GPU 180 may be external to the aircraft (e.g., part of a ground cart, part of a gate, etc.) while the accessory gearbox 170 (and the starter-generator 175) may be internal to the aircraft (e.g., within the jet engine 110). The GPU 180 may be electrically coupled to the aircraft while the aircraft is on the ground (e.g., at a gate of an airport) to supply electrical energy to subsystems (e.g., lighting, environmental control system (ECS), etc.) that operate while the jet engine 110 is OFF. Accordingly, the aircraft interface 101 may include a connector 185 for electrically coupling the GPU 180 to an auto-transformer rectifier unit (i.e., ATRU 190) within the aircraft.

An ATRU 190 can be configured to transform power from a first power domain (i.e., first amplitude) to a second power domain (i.e., second amplitude). For example, when the starter-generator 175 is in a motor mode (i.e., receiving power), a GPU output power (i.e., GPU output) in a lower-voltage domain (e.g., 115 VAC) from the GPU 180 may be transformed by the ATRU 190 to an ATRU output power (i.e., ATRU output) in a higher-voltage domain (e.g., 235 VAC). The ATRU output may be coupled to an alternating current (AC) bus (i.e., VAC bus 178) so the accessory gearbox 170, as well as other devices, coupled to the AC bus 178 may receive the ATRU output. The ATRU output (and GPU output) may be three-phase electrical power including three alternating signals (i.e., voltages), with each voltage oscillating at a frequency and each voltage signal shifted in phase (e.g., 120 degrees) relative to each other.

In a possible implementation, the ATRU 190 may be further configured to convert between power domains (i.e., power types). For example, the ATRU 190 can be configured to convert (i.e., rectify) an AC signal to a DC signal (VDC). For example, the GPU output (e.g., 115 VAC) or the ATRU output (e.g., 235 VAC) may be converted to a direct current (DC) voltage (e.g., 540 VDC). The DC voltage may be coupled to a DC bus 179 of the aircraft.

The ATRU 190 supplied by a GPU 180 may be configured to transmit power to the starter-generator 175 through the AC bus 178 in order to (electrically) start the jet engine 110. Starting the jet engine 110 may require rotating the shaft 150 to a fraction of the operating rotational speed so that the airflow and combustion process described above can be started. For an electric start, the starter-generator 175 is operated as an electric motor (i.e., in start mode) configured to convert electrical energy into mechanical energy to turn the accessory gearbox 170, which turns the shaft 150 of the jet engine 110. Each jet engine of an aircraft may include an accessory gearbox and each accessory gearbox may include a corresponding starter-generator. For example, an aircraft with four jet engines may include four accessory gearboxes and four starter-generators. The four accessory gearboxes may be coupled to the AC bus 178.

A start process for an aircraft may include electrically starting a first jet engine using the ATRU 190 (supplied by the GPU 180), to power the starter-generator 175 as a starter (i.e., in motor mode). Once the first jet engine is started, the starter-generator 175 may operate as a generator (i.e., in generator mode) to supply electrical power to the AC bus 178 (and optionally the DC bus 179) via the ATRU 190. Accordingly, after starting the first, the GPU 180 may be disconnected, and the other jet engines may be started using the electrical power generated by the first starter-generator (turned by rotating shaft 150) of the first jet engine.

For a successful start, the power supplied by the ATRU 190 is required to start rotation of the shaft 150 from a stationary state to a moving state. Further, the power supplied by the ATRU 190 is required to accelerate the speed of the rotation 125 to the necessary fraction of the operating rotation speed necessary for starting. Starting is not possible (or not safe) when the (electrical) energy supplied by the ATRU 190 (and GPU 180) is insufficient to accomplish either (or both) of these requirements.

Jet engines classified (in this disclosure) as conventional may have lower energy requirements for starting (e.g., ≤90 kVA), or have an auxiliary power unit (APU) to provide start power, whereas jet engines classified (in this disclosure) as unconventional may have higher energy requirements for starting (e.g., >90 kVA) on an aircraft without an APU. It may be undesirable (e.g., inefficient) for an airport to have lower-rated GPUs for starting conventional jet engines and higher-rated GPUs (e.g., custom GPUs) for starting unconventional jet engines. An example of an unconventional jet engine may be a jet engine for an aircraft that can travel at speeds above the speed of sound (i.e., supersonic). The techniques described herein allow for both the conventional jet engines and the unconventional jet engines to use the lower energy rated GPUs for starting without an APU. It should be noted that a starter-generator of an unconventional aircraft may have a higher energy rating (e.g., 250 kVA) that is suitable for starting the other jet engines on the unconventional aircraft when operated as a generator (i.e., in generator mode).

As shown in FIG. 1, in a possible implementation, electrical power from the ATRU 190 (i.e., first ATRU) (supplied by the GPU 180) may be increased by combining it on the AC bus 178 with electrical power from a second ATRU 191 (supplied by a second GPU 182). The combined electrical power (i.e., combined power) may be sufficient for starting an unconventional jet engine. Additionally, because the ATRUs electrically convert a voltage/frequency provided by the GPUs to a voltage/frequency required by the aircraft, there may be more versatility in which GPUs can be coupled to the aircraft for power.

A plurality of ATRUs (supplied by a plurality of corresponding GPUs) may be coupled electrically in a parallel connection (i.e., in parallel) to the AC bus 178 so that the power generated can be divided (e.g., equally, not equally) between the plurality of ATRUs. In other words, the electrical bus may carry (i.e., transmit) combined power from the plurality of ATRUs. As a result, the maximum power that can be supplied to the accessory gearbox 170 can be increased. Accordingly, the disclosed approach may be versatile for a variety of jet engines having different start energy requirements.

Figure 2:
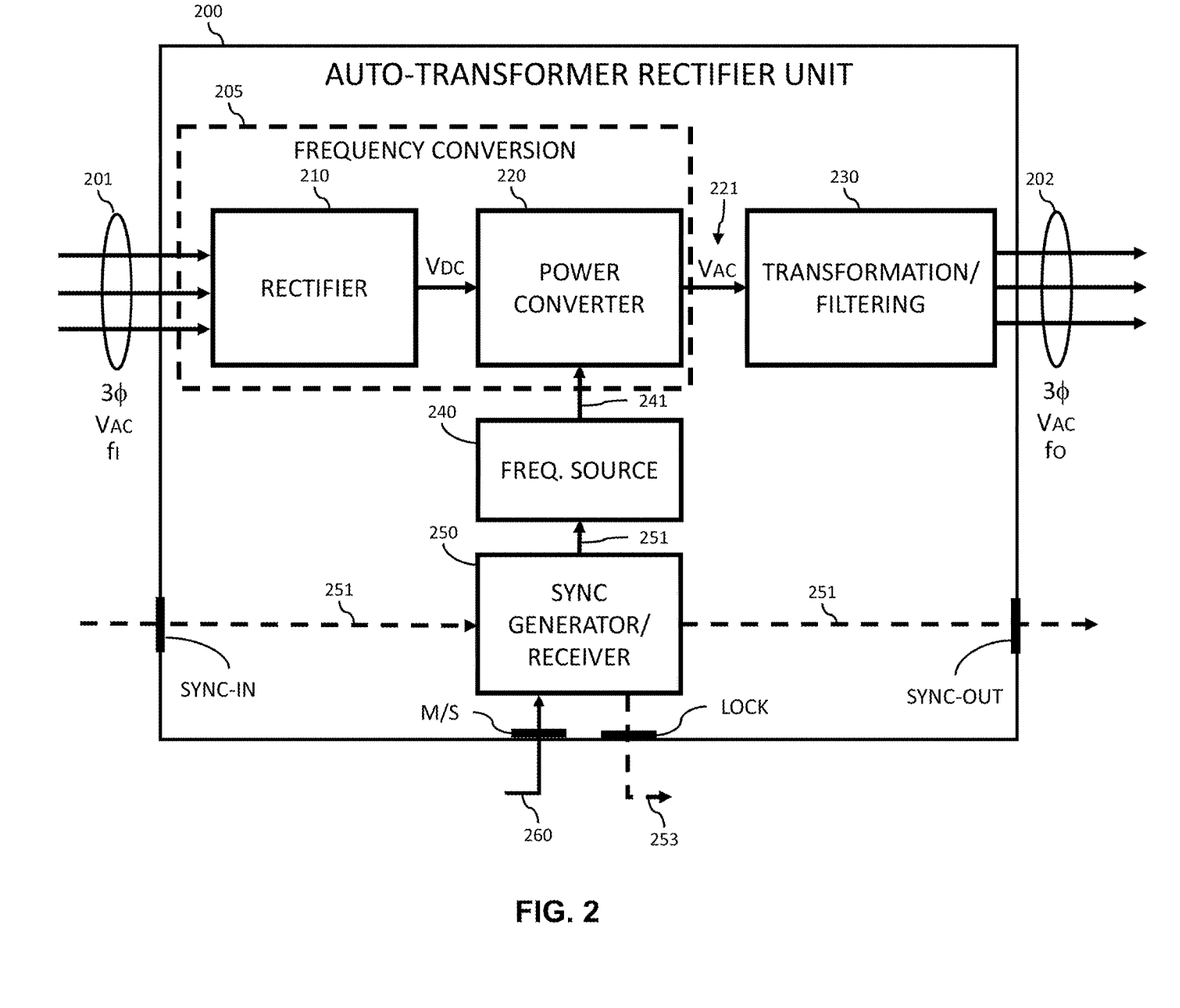
FIG. 2 is a block diagram of an auto-transformer rectifier unit according to a possible implementation of the present disclosure.

FIG. 2 is a block diagram of an ATRU according to a possible implementation of the present disclosure. The ATRU 200 is configured to receive a GPU output 201. The GPU output 201 can be a three-phase (3ϕ) AC signal in a first voltage amplitude (e.g., lower voltage domain) that oscillates (for each phase of three phases) at an input frequency ($f_i$). The ATRU 200 can further include a frequency conversion stage 205 that is configured to synthesize an AC waveform 221 ($V_{AC}$) based on the GPU output 201. The AC waveform 221 may be filtered and transformed into ATRU output 202 based on the AC waveform 221. The ATRU output 202 can be a three-phase AC signal in a second voltage amplitude (e.g., higher voltage domain—as compared to the lower voltage domain).

The frequency conversion stage 205 may include a rectifier 210 configured to generate a DC signal ($V_{DC}$) based on the GPU output 201. The frequency conversion stage 205 may further include a power converter 220 that can synthesize the AC waveform 221 based on the DC signal. For example, the power converter 220 may be an inverter that is configured to generate a pulse width modulated (PWM) signal that can be filtered to form the AC waveform 221 at the output frequency ($f_o$). This process may include switching and modulating that can require a reference signal (i.e., frequency signal 241). Accordingly, the power converter 220 may be coupled to a frequency source 240 configured to provide the power converter with a frequency signal 241 that can be used to convert the DC signal ($V_{DC}$) into the AC waveform 221 ($V_{AC}$). In other words, the AC waveform 221 may be synthesized based on the frequency signal 241 from the frequency source 240 and the DC signal ($V_{DC}$) from the rectifier 210. In a possible implementation, the frequency signal 241 is implemented as one or more switching signals for a rectifier circuit (e.g., half-bridge, full-bridge) in the power converter 220.

The ATRU can further include a transformation/filtering stage 230 configured to output an ATRU output 202 based on the AC waveform 221. The transformation/filtering stage may include an autotransformer (e.g., delta transformer, wye transformer) configured to transform the AC waveform 221 into a three-phase (3ϕ) signal that has a phase voltage that is stepped up (or stepped down) from the voltage of the AC waveform 221. Filtering (e.g., low pass filtering) may be included to reduce artifacts caused by the frequency conversion process. Neither the transformation nor the filtering may alter the fundamental frequency of the AC waveform 221. Accordingly, the ATRU output can be a three phase AC signal that oscillates (for each phase) the frequency of the AC waveform 221 (i.e., output frequency ($f_o$)). The output frequency ($f_o$) is independent of the input frequency ($f_i$), meaning that the ATRU 200 may output an ATRU output 202 at a frequency ($f_o$) that is different from (or the same as) the frequency ($f_i$) of the GPU output 201 at its input. The frequency ($f_o$) and phase ($\phi_o$) of the frequency signal 241, and therefore the AC waveform 221, may correspond to a sync signal (i.e., clock signal).

As mentioned, the ATRU 200 may be one of a plurality of ATRUs used in a system. When multiple ATRUs are used in the system their outputs can be synchronized by adjusting the outputs of some of the ATRUs (i.e., slave ATRUs) to match a frequency and a phase of an ATRU designated as a reference (i.e., master ATRU). Practically speaking, synchronizing the slave ATRUs may include manipulating their output frequency to substantially match the output frequency of the master ATRU ($f_o$) within a frequency margin (e.g., ±1 Hz) and making their output phase (e.g., reference phase of the 3ϕ $V_{AC}$) match the output phase shift ($\phi_o$) of the master ATRU within a phase margin (e.g., ±1 deg).

The circuitry of each ATRU of the plurality of ATRUs may be the same, meaning that each ATRU can be configured as a master ATRU or a slave ATRU depending on the particular implementation. Accordingly, each ATRU may be configured to operate in a master mode when they are designated as the master of the plurality of ATRUs or configured to operate in a slave mode when they are not designated as the master of the plurality of ATRUs. The designation of master and slave ATRUs in a group of ATRUs may be fixed or may be adjustable. In the fixed condition, the designation may be set by a switch, jumper, digital assignment, or firmware condition, while in the adjustable condition, the designation may be set by a master/slave signal.

A master or slave status (i.e., state, mode) of an ATRU may be designated by a master/slave signal 260 received at the ATRU 200. For example, the master/slave signal 260 may be received at a master/slave (M/S) port of the ATRU 200. The ATRU may be triggered to operate according to either a master mode or a slave mode based on a state of the master/slave signal 260. For example, a first level of the master/slave signal 260 may correspond to operation in a master mode, while a second level of the master/slave signal 260 may correspond to operation in a slave mode.

In one possible implementation, the master/slave signal 260 corresponds to a GPU connection sequence. For example, the ATRU having the GPU that is first to come online may be designated as the master (i.e., operate in master mode). In another possible implementation, the master/slave signal corresponds to a position programming (e.g., memory setting, jumper setting, digital position assignment, etc.) of the ATRU. For example, each ATRU in an aircraft may have a different pin programming based on where, in the aircraft, they are located. In another possible implementation, the master/slave signal corresponds to a user input.

When an ATRU of a plurality of ATRUs is operated in the master mode, it is configured to generate a sync signal for all the ATRUs to use for their respective frequency conversion. In particular, the sync signal generated by the master ATRU is used by each frequency source of each ATRU in the plurality (including the master ATRU) to create each frequency signal 241 necessary to synthesize each AC waveform. Because all frequency conversions use the same sync signal (i.e., clock signal), all of the ATRU outputs may be synchronized (i.e., phase locked, locked).

The ATRU 200 further includes a sync generator/receiver 250 that is configured by the master/slave signal 260 to either generate the sync signal 251 or receive the sync signal 251. In the master mode, the sync generator/receiver 250 is configured to generate the sync signal. In other words, when the ATRU 200 is operated in (i.e., configured for) the master mode, the frequency source 240 of the ATRU 200 is configured to receive the sync signal 251 generated by the sync generator/receiver 250. Further, in the master mode, the sync generator/receiver 250 is configured to transmit the sync signal 251 to the slave ATRUs. For example, the ATRU 200 may include a sync output (SYNC OUT), which can be connected to a sync input of ATRUs operating in a slave mode in order to provide the sync signal.

In the slave mode, the sync generator/receiver 250 is configured to receive the sync signal. In other words, when the ATRU 200 is operated in (i.e., configured for) the slave mode, the frequency source 240 of the ATRU 200 is configured to receive the sync signal 251 generated by the master ATRU. For example, the ATRU 200 may include a sync input (SYNC IN), which can be connected to a sync output of an ATRU operating in a master mode in order to receive the sync signal. In the slave mode, the sync generator/receiver 250 may (optionally) be configured to transmit the sync signal 251 to other ATRUs (e.g., in a daisy chain connection). Alternatively, in the slave mode, the sync generator/receiver 250 may not be configured to transmit the sync signal, and in this implementation the sync output (SYNC-OUT) may be unused.

When the ATRU 200 is operated in (i.e., configured for) the slave mode, the sync generator/receiver 250 may be further configured to generate a lock signal 253. The lock signal may indicate (e.g., via a level of the lock signal) that the ATRU signal 202 generated by the ATRU 200 is synchronized with the sync signal shared by the ATRUs. Accordingly, the lock signal may indicate that outputs of a first ATRU and a second ATRU are at (approximately) the same frequency and have (approximately) the same phase (i.e., are synchronized). Accordingly, the ATRU may include a lock output (LOCK), which can be connected to a generator control unit (GCU) of the aircraft to control the combining of the ATRU outputs into a combined power.

Figure 3:
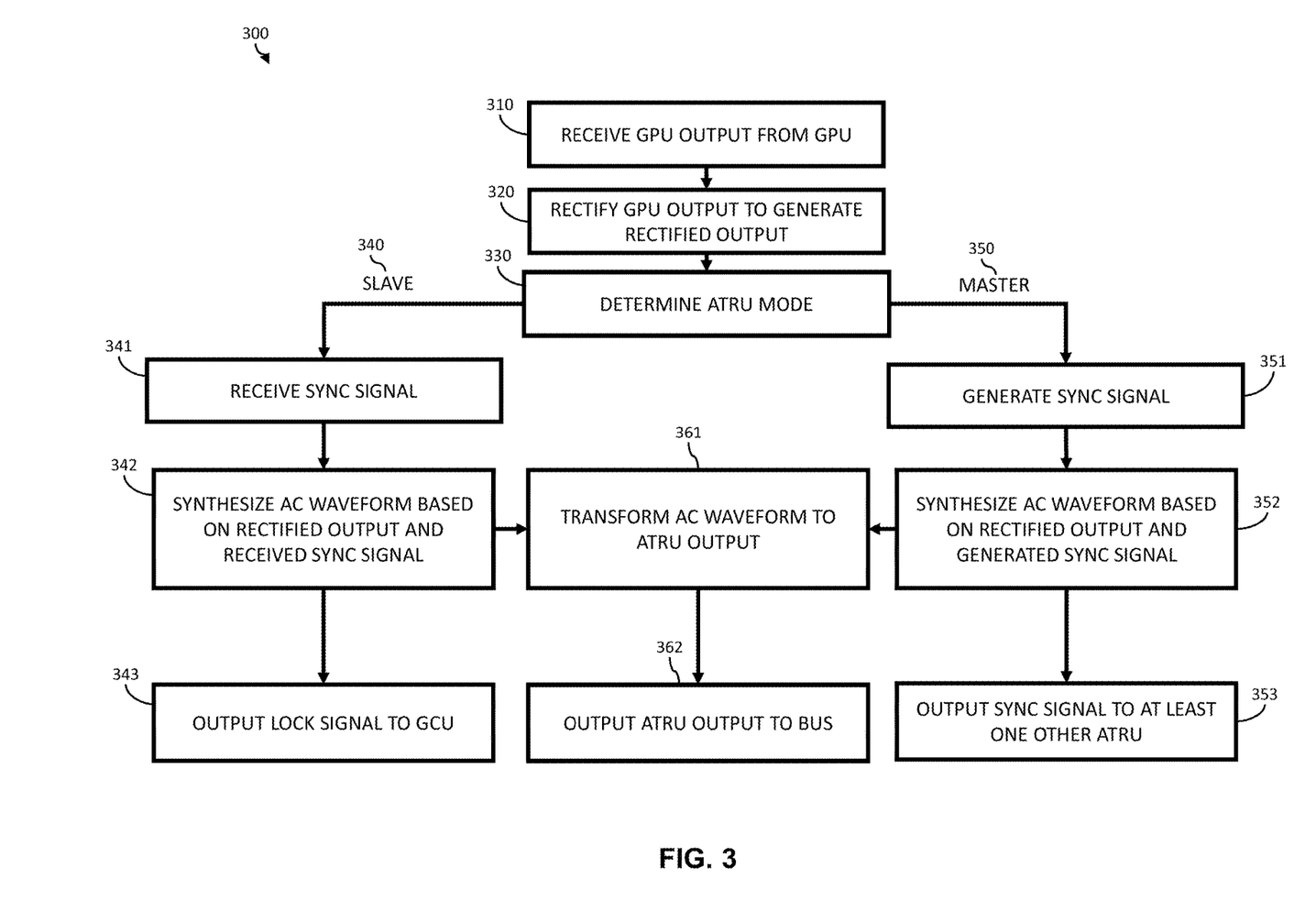
FIG. 3 is a flowchart of a method for operating an auto-transformer rectifier unit according to a possible implementation of the present disclosure.

FIG. 3 is a flowchart of a method for operating an auto-transformer rectifier unit, such as shown in FIG. 2. The method 300 includes receiving 310 a GPU output. As described previously, the GPU output may be received from a GPU and coupled to the ATRU via a connector (or connectors) at an exterior surface of the aircraft. The method 300 further includes rectifying 320 the GPU output to create a rectified signal ($V_{DC}$). The rectification transforms the AC waveform with a fundamental frequency into a DC waveform with no fundamental frequency. The method 300 further includes determining 330 an operating mode of the ATRU as either a master mode 350 or a slave mode 340.

In the master mode 350, the method 300 includes generating 351 a sync signal and synthesizing 352 an AC waveform ($V_{AC}$) based on the generated sync signal (and the rectified signal). In the master mode 350, the method 300 further includes outputting 353 the sync signal to at least one other (i.e., slave) ATRU.

In the slave mode 340, the method 300 includes receiving 341 the sync signal and synthesizing 342 the AC waveform ($V_{AC}$) based on the received sync signal (and the rectified signal). In the slave mode 340. the method 300 further includes outputting 343 a lock signal to a GCU. The lock signal can indicate that the ATRU in the slave mode is using the sync signal from the ATRU in the master mode for a frequency conversion.

In both the master mode 350 and the slave mode 340, the method 300 includes transforming 361 (and filtering) the AC waveform ($V_{AC}$) based on the generated (or received) sync signal into an ATRU output and outputting 362 the ATRU output to a bus.

Figure 4:
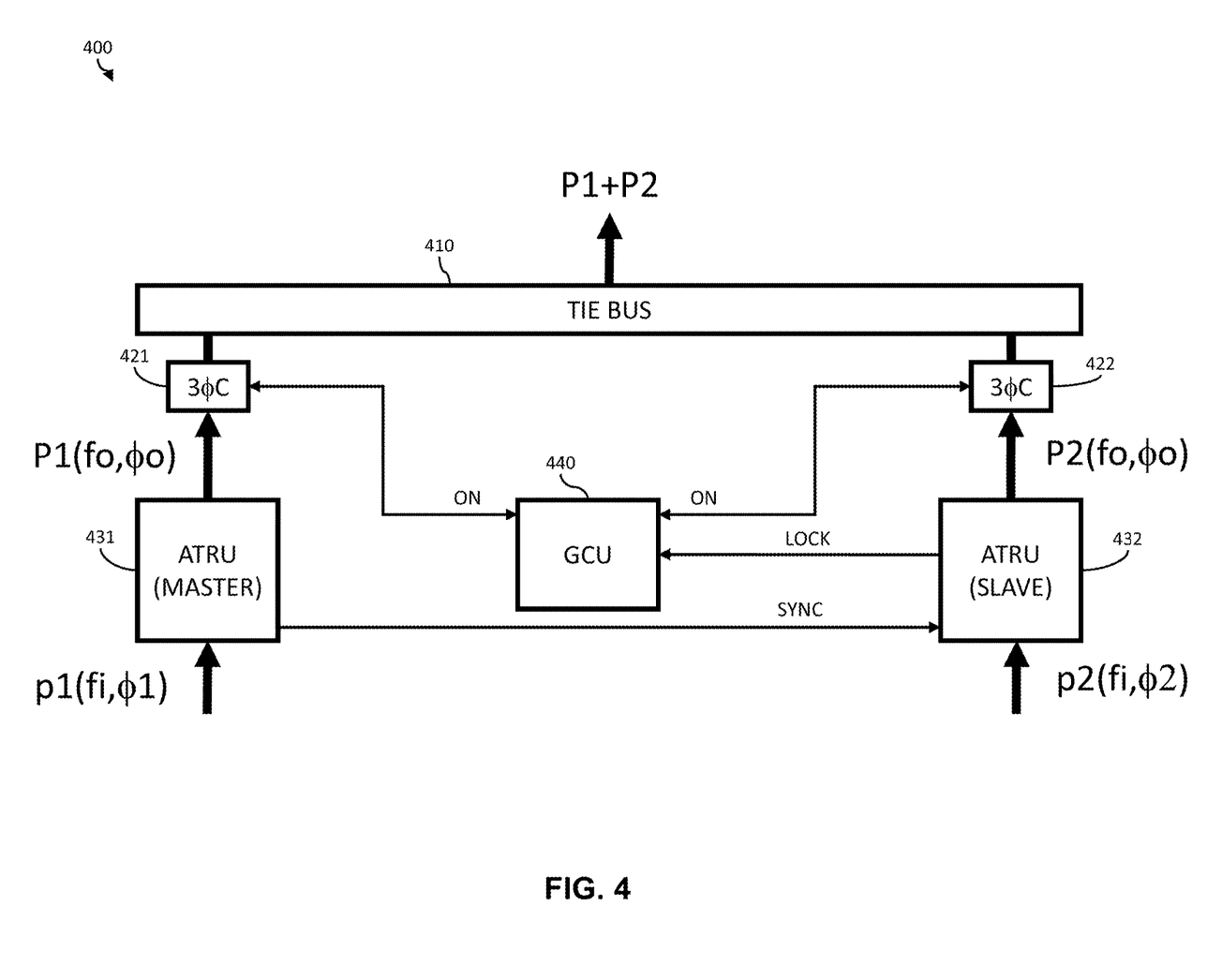
FIG. 4 illustrates a block diagram of a system for combining power on a bus according to a possible implementation of the present disclosure.

FIG. 4 illustrates a block diagram of a system for combining power on a bus according to a possible implementation of the present disclosure. The system 400 includes a first ATRU 431 and a second ATRU 432. The first ATRU 431 is configured to output a first ATRU output (i.e., $P1(f_o,\phi_o)$) based on a first GPU output (i.e., $p1(f_i,\phi_1)$). The second ATRU 432 is configured to output a second ATRU output (i.e., $P2(f_o,\phi_o)$) based on a second GPU output (i.e., $p2(f_i,\phi_2)$).

The first ATRU 431 is further configured to, as the master ATRU, output a sync signal (SYNC). The sync signal (SYNC) configures the second ATRU 432 to output a second ATRU output (i.e., $P2(f_o,\phi_o)$) that has the same frequency (i.e., $f_o$) and phase (i.e., $\phi_o$) as the first ATRU output (i.e., $P1(f_o,\phi_o)$). It should be noted that the first GPU output (i.e., $p1(f_i,\phi_1)$) and the second GPU output (i.e., $p_2(f_i,\phi_2)$) are not required to have the same phase (i.e., $\phi_1 \neq \phi_2$). In other words, the GPU outputs can be asynchronous (i.e., out of phase) while the ATRU outputs are synchronous (i.e., in phase).

The second ATRU 432 is further configured to, as the slave ATRU, output a lock signal (LOCK) upon outputting a valid second ATRU output. The lock signal (LOCK) configures a GCU 440 to couple the outputs of the first ATRU 431 and the second ATRU 432 to a bus (e.g., tie bus 410). In particular, the system 400 may include a first three-phase contactor (i.e., first contactor 421) coupled between the first ATRU 431 and the tie bus 410 and a second three-phase contactor (i.e., second contactor 422) coupled between the second ATRU 432 and the tie bus 410. The first contactor 421 and the second contactor 422 may be configured to decouple the tie bus 410 from the ATRUs when the contactors are in an OFF condition (open circuit, open, etc.) and to couple the tie bus 410 to the ATRUs when the contactors are in an ON condition (short circuit, closed, etc.). Accordingly, when the GCU 440 receives a sync signal indicating that the first ATRU 431 and the second ATRU 432 are synchronized (i.e., phase locked), then it may transmit signals to the first contactor 421 and the second contactor 422 to configure them in the ON condition.

The tie bus 410 and the contactors may be configured so that the first ATRU output (i.e., $P1(f_o,\phi_o)$) and the second ATRU output (i.e., $P2(f_o,\phi_o)$) are electrically connected in parallel. The first ATRU output (i.e., $P1(f_o,\phi_o)$) and the second ATRU output (i.e., $P2(f_o,\phi_o)$) are summed on the bus and because they have the same frequency and phase (i.e., are synchronized) the resultant combined power is the additive sum of the signals (P1+P2).

Figure 5:
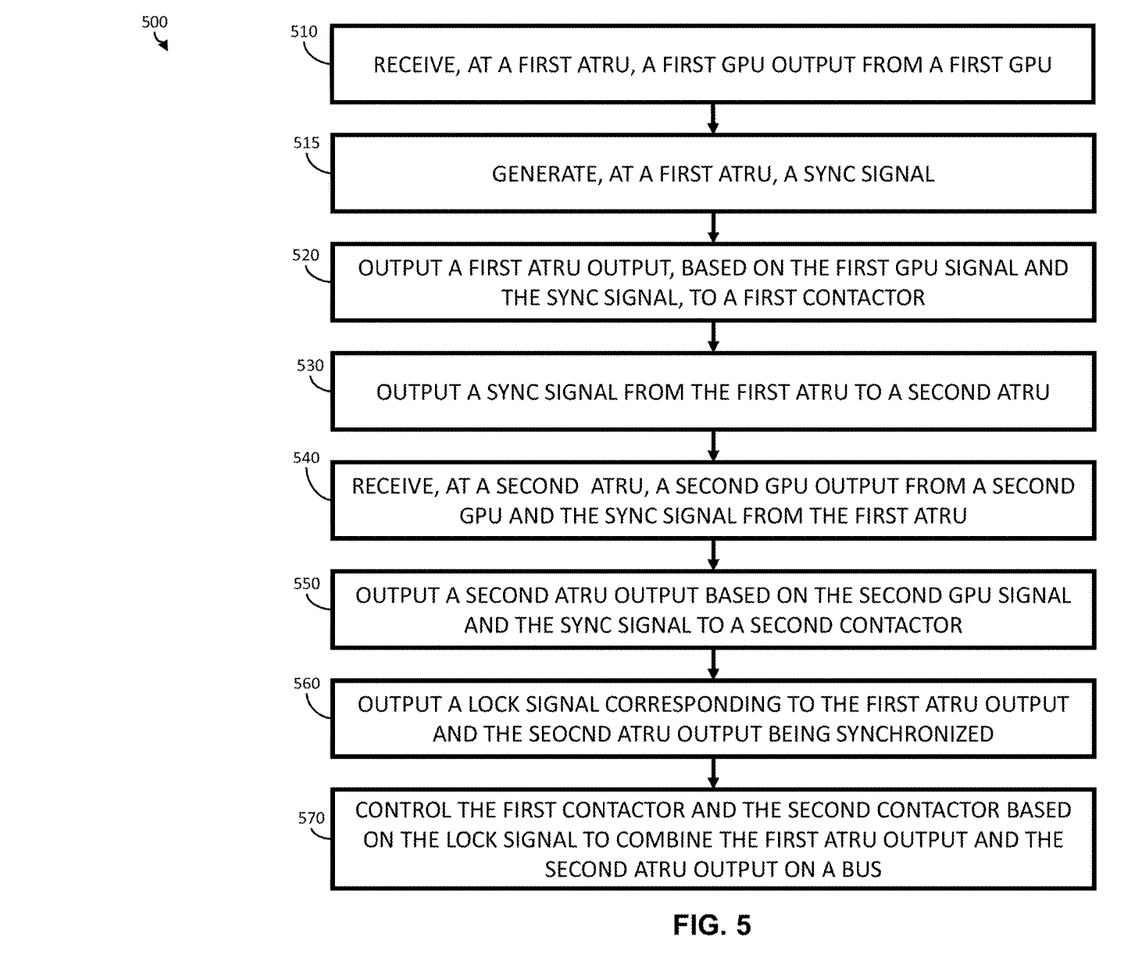
FIG. 5 is a flowchart of a method for combining power on a bus according to a possible implementation of the present disclosure.

FIG. 5 is a flowchart of a method for combining power on a bus, such as in the system of FIG. 4. The method 500 includes receiving 510 a first GPU output at a first ATRU. The first GPU output can be generated by a first GPU connected to an input of the first ATRU. The method further includes generating 515 a sync signal at the first ATRU. The method 500 further includes outputting 520 a first ATRU output from the first ATRU to a first contactor. The first ATRU output is based on the first GPU output and the sync signal. The method 500 further includes outputting 530 a sync signal from the first ATRU and receiving 540 the sync signal at the second ATRU. Additionally, the second ATRU receives a second GPU output from a second GPU. The method 500 further includes outputting 550 a second ATRU output from the second ATRU to a second contactor. The second ATRU output is based on the second GPU output and the sync signal. The method 500 further includes outputting 560 a lock signal from the second ATRU. The lock signal corresponds to the first ATRU and the second ATRU being synchronized. The method 500 further includes controlling 570 the first contactor and the second contactor based on the lock signal to combine the first ATRU output and the second ATRU output on a bus.

Figure 6:
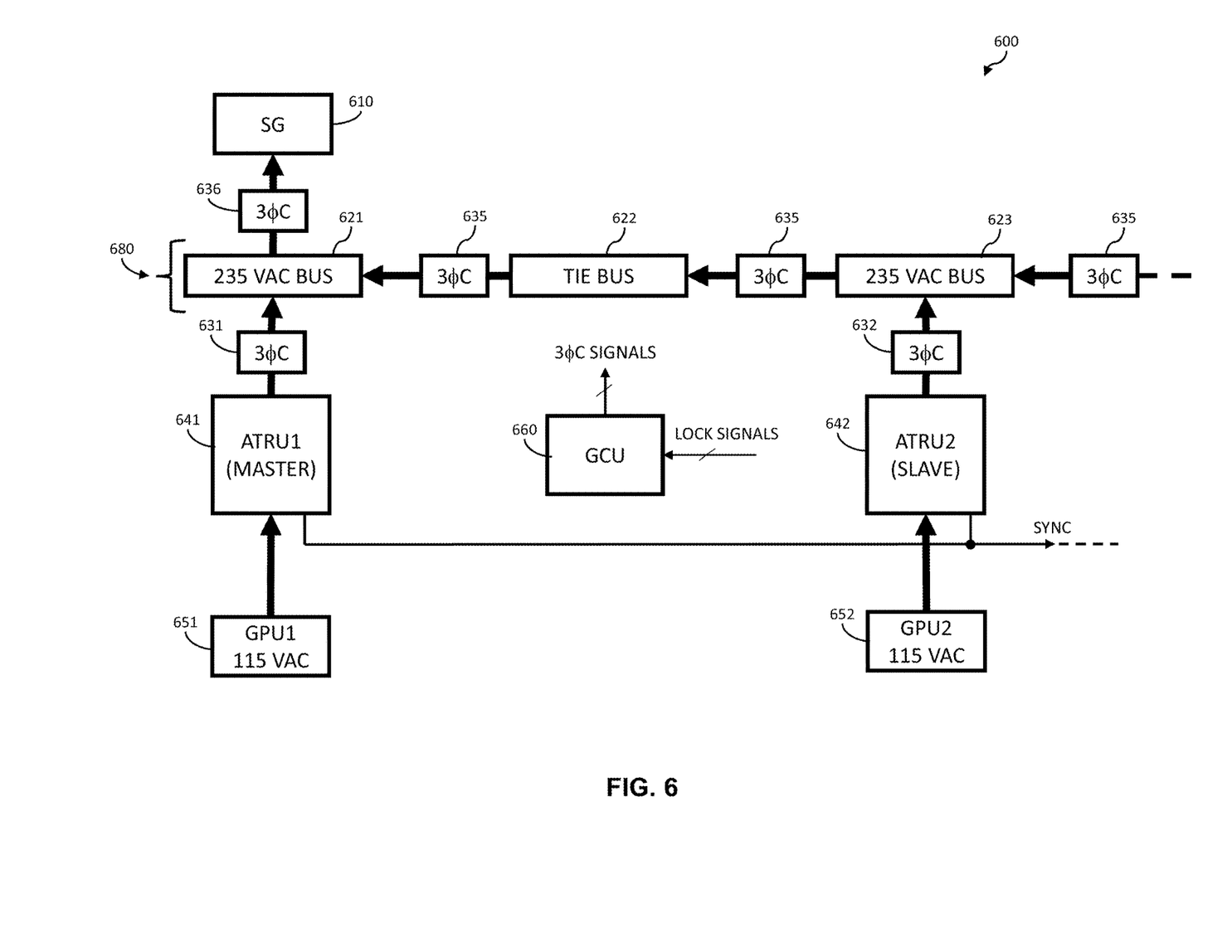
FIG. 6 illustrates a block diagram of a system for starting a jet engine using combined power from multiple ground power units according to a possible implementation of the present disclosure.

FIG. 6 illustrates a block diagram of a system for starting a jet engine using combined power from multiple ground power units according to a possible implementation of the present disclosure. In this implementation, more details are provided regarding a possible bus network for a practical application. The system 600 includes a starter-generator 610 configured to receive combined power for starting a jet as described above. The system 600 includes a plurality of GPUs (i.e., GPU1 651, GPU2 652) configured to supply a plurality of ATRUs (i.e., first ATRU 641, second ATRU 642), which are synchronized by a sync signal (SYNC) generated by a master ATRU (i.e., first ATRU 641) and transmitted to slave ATRUs (i.e., second ATRU 642).

The system 600 further includes a generator control unit (i.e., GCU 660) which is configured to control a plurality of contactors based on lock signals from the plurality of ATRUs (e.g., the plurality of slave ATRUs). As shown, contactors 631, 632 can be configured to couple the ATRUs to a bus network 680, on which their power is combined. The plurality of contactors further include a contactor 636 that can be configured to couple the combined power from the bus network 680 to the starter-generator 610. The bus network 680 can include a plurality of AC buses coupled together by one or more tie buses. As shown, a first AC bus 621 can be coupled to a second AC bus 623 by a tie bus 622. To accomplish this the bus network includes a plurality of contactors 635 between the buses. When the ATRUs are synchronized, the contactors may be closed and power for starting the jet engine may flow as shown by arrows in the figures.

Figure 7:
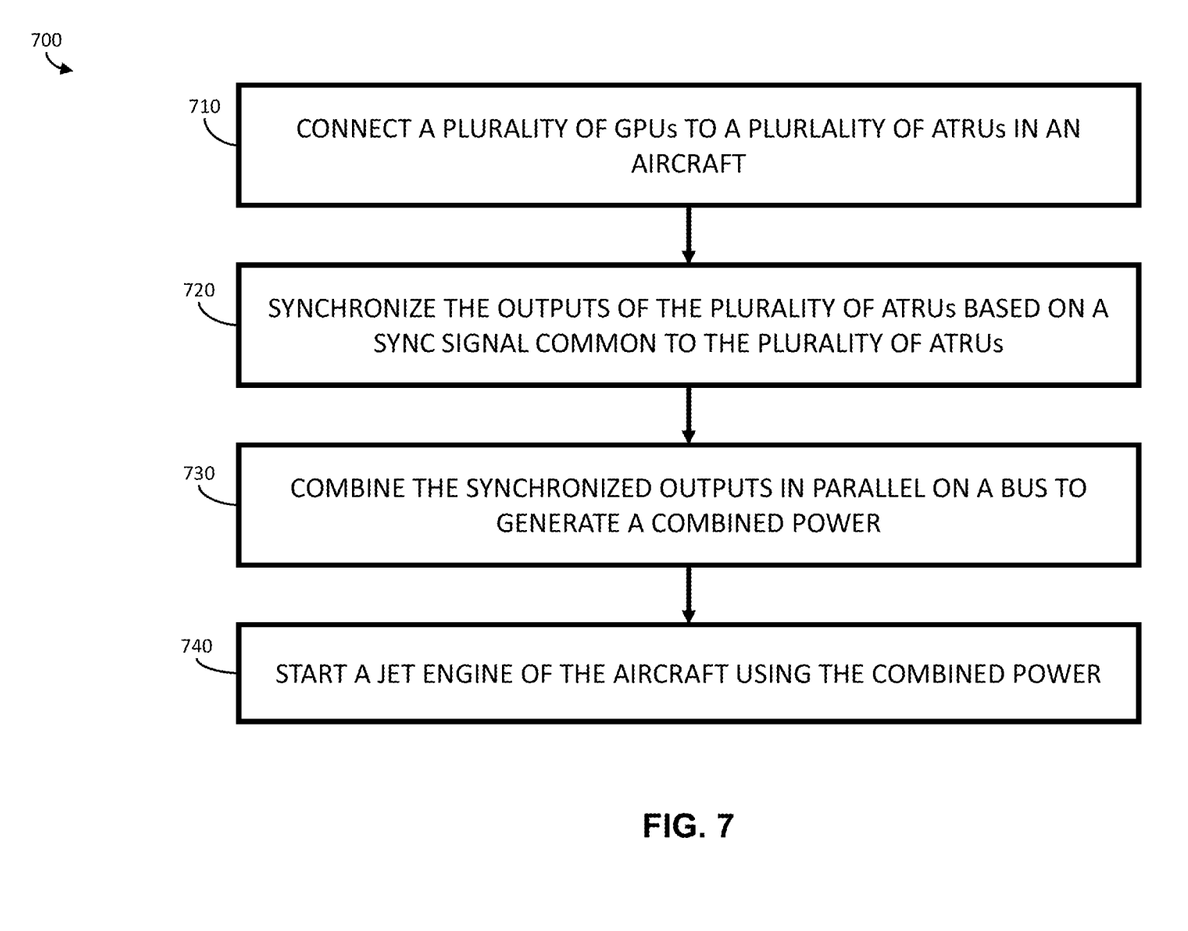
FIG. 7 is a flowchart of a method for starting a jet engine using combined power from multiple ground power units according to a possible implementation of the present disclosure.

FIG. 7 is a flowchart of a method for starting a jet engine using combined power from multiple ground power units, such as in the system of FIG. 6. The method 700 includes connecting 710 a plurality of GPUs to a plurality of ATRUs in an aircraft. The method 700 further includes synchronizing 720 the outputs of the plurality of ATRUs based on a sync signal common to the plurality of ATRUs. The method further includes combining 730 the synchronized outputs in parallel on a bus to generate a combined power and starting 740 a jet engine of the aircraft using the combined power. In the event that the outputs of the plurality of ATRUs cannot be synchronized, the system may retry using the same approach for synchronization. Alternatively the system may retry synchronized used an adjusted approach. In one possible implementation, the fundamental frequency may be shifted to in a subsequent attempt to synchronize the outputs of the ATRUs. In another possible implementation, a master/slave status assigned to the ATRUs may be rearranged in a subsequent attempt to synchronize the outputs of the ATRUs. The system may count attempts and issue a warning or alert (e.g., for user intervention) if the count reaches a threshold.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for combining power on a bus of an aircraft, the method comprising:
  receiving, at a first autotransformer rectifier unit (ATRU), a first GPU output from a first ground power unit (GPU);
  generating a sync signal at the first ATRU;

outputting, at the first ATRU, a first ATRU output based on the first GPU output and the sync signal;

receiving, at a second autotransformer rectifier unit (ATRU), a second GPU output from a second ground power unit (GPU) and the sync signal from the first ATRU;

outputting, at the second ATRU, a second ATRU output based on the second GPU output and the sync signal; and coupling the first ATRU output and the second ATRU output in parallel to the bus to generate a combined power on the bus.

2. The method according to claim 1, wherein generating the sync signal at the first ATRU includes:
determining that the first ATRU is in a master mode; and
generating the sync signal at the first ATRU when the first ATRU is in the master mode.

3. The method according to claim 1, wherein outputting the first ATRU output based on the first GPU output and the sync signal includes:
generating a first frequency signal based on the sync signal generated at the first ATRU;
synthesizing a first alternating current (AC) waveform based on the first frequency signal; and
transforming the first AC waveform into the first ATRU output.

4. The method according to claim 3, wherein:
the first GPU output oscillates at an input frequency; and
the first AC waveform oscillates at an output frequency, wherein the output frequency is decoupled from the input frequency.

5. The method according to claim 3, wherein the sync signal has a frequency and a phase that substantially matches the first AC waveform.

6. The method according to claim 1, wherein outputting, at the second ATRU, the second ATRU output based on the second GPU output and the sync signal includes:
generating a second frequency signal based on the sync signal received from the first ATRU;
synthesizing a second alternating current (AC) waveform based on the second frequency signal; and
transforming the second AC waveform into the second ATRU output.

7. The method according to claim 1, further comprising:
generating, at the second ATRU, a lock signal upon outputting the second ATRU output, the lock signal indicating that the first ATRU output and the second ATRU output are synchronized.

8. The method according to claim 7, further comprising:
controlling a first contactor to connect the first ATRU output to the bus based on the lock signal; and
controlling a second contactor to connect the second ATRU output to the bus based on the lock signal.

9. The method according to claim 1, further comprising:
starting a jet engine using the combined power on the bus.

10. A system for combining power on a bus of an aircraft, the system comprising:
a first autotransformer rectifier unit (ATRU) configured to output a first ATRU output based on a first GPU output from a first ground power unit (GPU), the first ATRU including:
a first sync generator/receiver configured to generate a sync signal;
a first frequency source configured to generate a first frequency signal based on the sync signal generated by the first sync generator/receiver;
a first frequency conversion stage configured to synthesize a first alternating current (AC) waveform based the first GPU output and the first frequency signal; and
a first transformer stage configured to transform the first AC waveform to the first ATRU output at a first output of the first ATRU; and
second autotransformer rectifier unit (ATRU) configured to output a second ATRU output based on a second GPU output from a second ground power unit (GPU), the second ATRU including:
a second sync generator/receiver configured to receive the sync signal from the first ATRU;
a second frequency source configured to generate a second frequency signal based on the sync signal received from the first ATRU;
a second frequency conversion stage configured to synthesize a second alternating current (AC) waveform based on the second GPU output and the second frequency signal; and
a second transformer stage configured to transform the second AC waveform to the second ATRU output at a second output of the second ATRU, the first ATRU output and the second ATRU output being synchronized by the sync signal.

11. The system according to claim 10, further comprising:
a first contactor coupled between the first output of the first ATRU and the bus;
a second contactor coupled between the second output of the second ATRU and the bus; and
a generator control unit configured to control the first contactor and the second contactor to couple the first ATRU output and the second ATRU output in parallel to the bus to generate a combined power on the bus.

12. The system according to claim 11, wherein the generator control unit controls the first contactor and the second contactor based on a lock signal received from the second ATRU, the lock signal indicating that the first ATRU output and the second ATRU output are synchronized.

13. The system according to claim 12, wherein the generator control unit further controls a third contactor to couple the combined power on the bus to a starter motor of a jet engine.

14. The system according to claim 10, wherein:
the first sync generator/receiver is configured receive a first master/slave signal that triggers the first ATRU to operate in a master mode; and
the second sync generator/receiver is configured to receive a second master/slave signal that triggers the second ATRU to operate in a slave mode.

15. The system according to claim 14, wherein the first master/slave signal and the second master/slave signal correspond to a GPU connection status based on the first GPU output and the second GPU output.

16. The system according to claim 14, wherein the first master/slave signal and the second master/slave signal correspond to a pin programming at the first ATRU and the second ATRU respectively.

17. The system according to claim 14, wherein the first master/slave signal and the second master/slave signal correspond to a user input.

18. The system according to claim 10, wherein:
the first ATRU output and the second ATRU output both oscillate at a first frequency;
the first GPU output and the second GPU output both oscillate at a second frequency; and
the first frequency is independent of the second frequency.

19. A method for combining power on a bus to start a jet engine of an aircraft, the method comprising:
    receiving a plurality of GPU outputs from a plurality of ground power units (GPUs) at a plurality of autotransformer rectifier units (ATRUs) of the aircraft;
    designating a first autotransformer rectifier unit (ATRU) of the plurality of ATRUs as a master ATRU;
    designating other ATRUs of the plurality of ATRUs as slave ATRUs;
    operating the first ATRU in a master mode, which includes:
        generating a sync signal at the master ATRU; and
        synthesizing a first ATRU output at an output of the first ATRU based on the sync signal and a first GPU output from a first ground power unit (GPU) of the plurality of GPUs;
    operating the other ATRUs in a slave mode, which includes:
        receiving the sync signal from the master ATRU; and
        synthesizing other ATRU outputs at outputs of the slave ATRUs based on the sync signal and other GPU outputs from other GPUs of the plurality of GPUs;
    coupling the first ATRU output and the other ATRU outputs in parallel to the bus to generate a combined power on the bus; and
    starting the jet engine of the aircraft using the combined power on the bus.

20. The method according to claim 19, wherein:
    the first GPU output and the other GPU outputs are asynchronous; and
    the first ATRU output and the other ATRU outputs are synchronous.

21. The method according to claim 20, wherein:
    the first GPU output and the other GPU outputs are at an input frequency; and
    the first ATRU output and the other ATRU outputs at an output frequency, wherein the output frequency is independent of the input frequency.

22. The method according to claim 21, wherein the output frequency is different from the input frequency.

\* \* \* \* \*